UNITED STATES PATENT OFFICE.

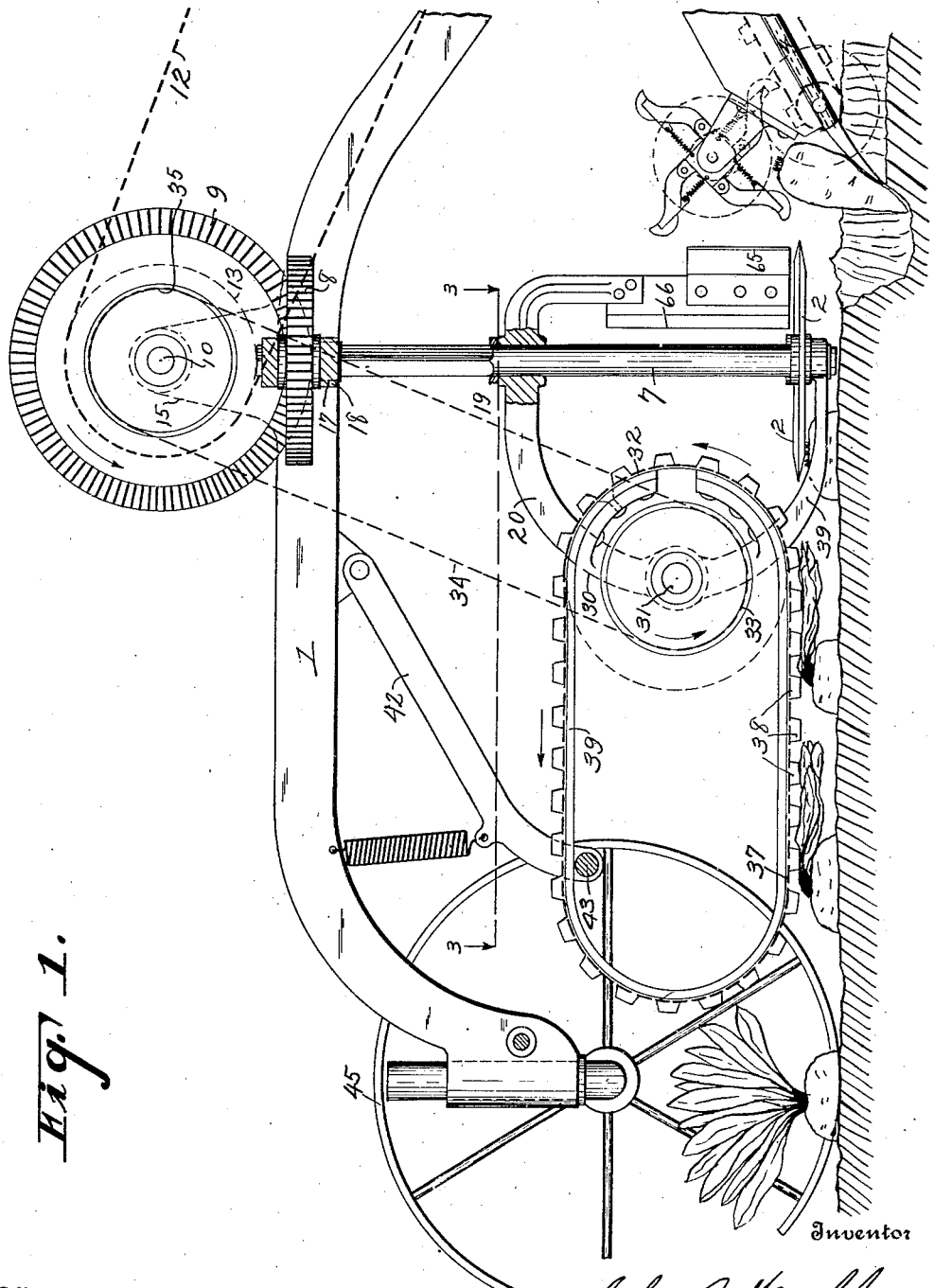

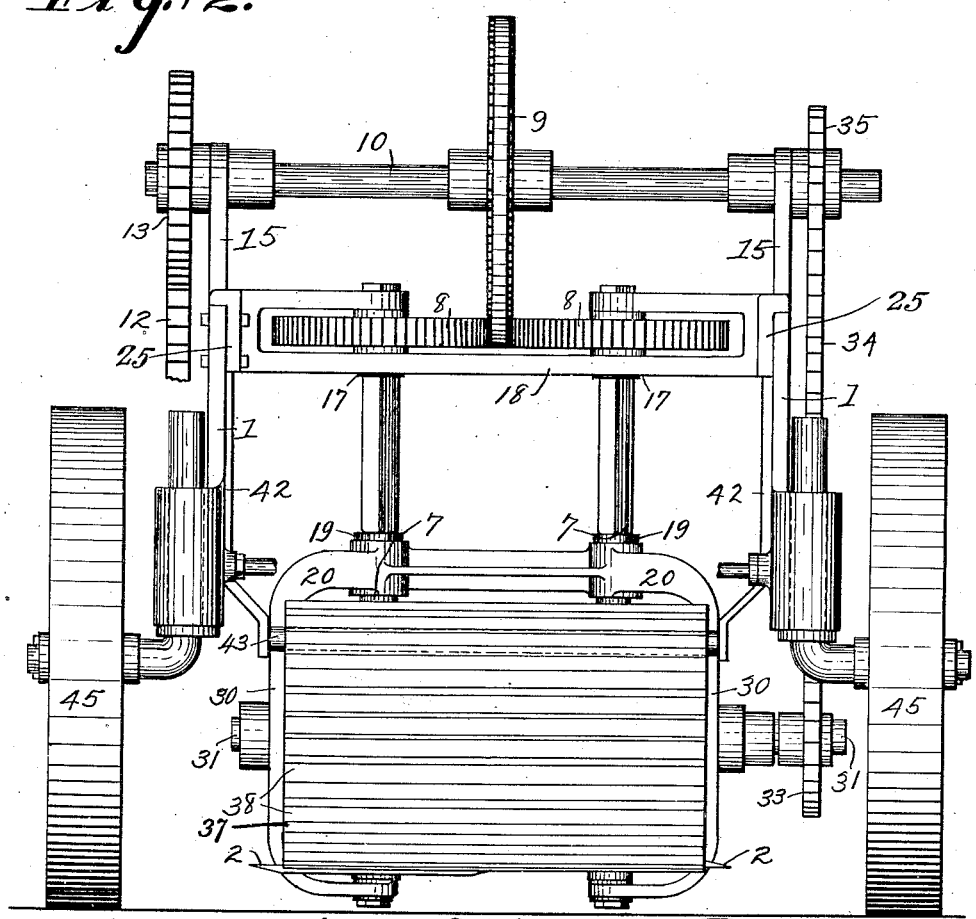
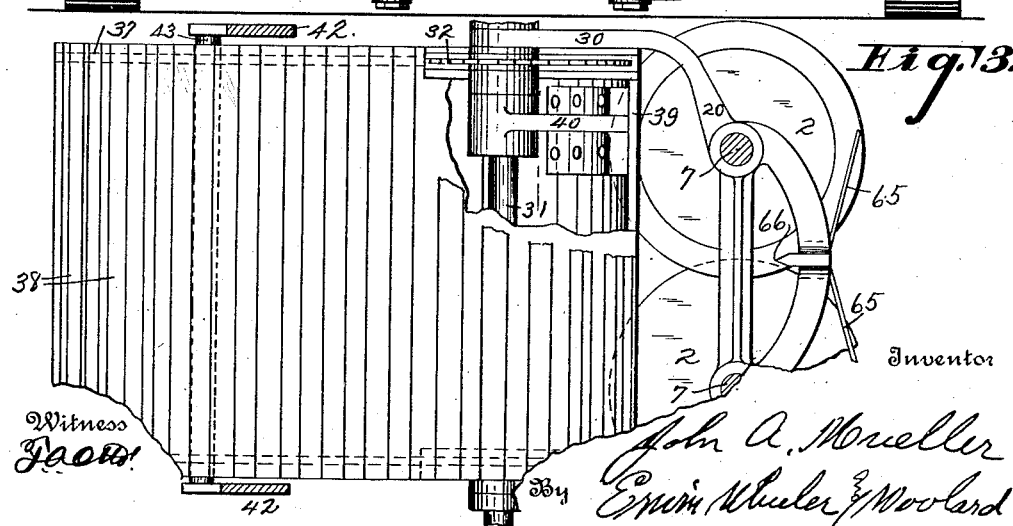

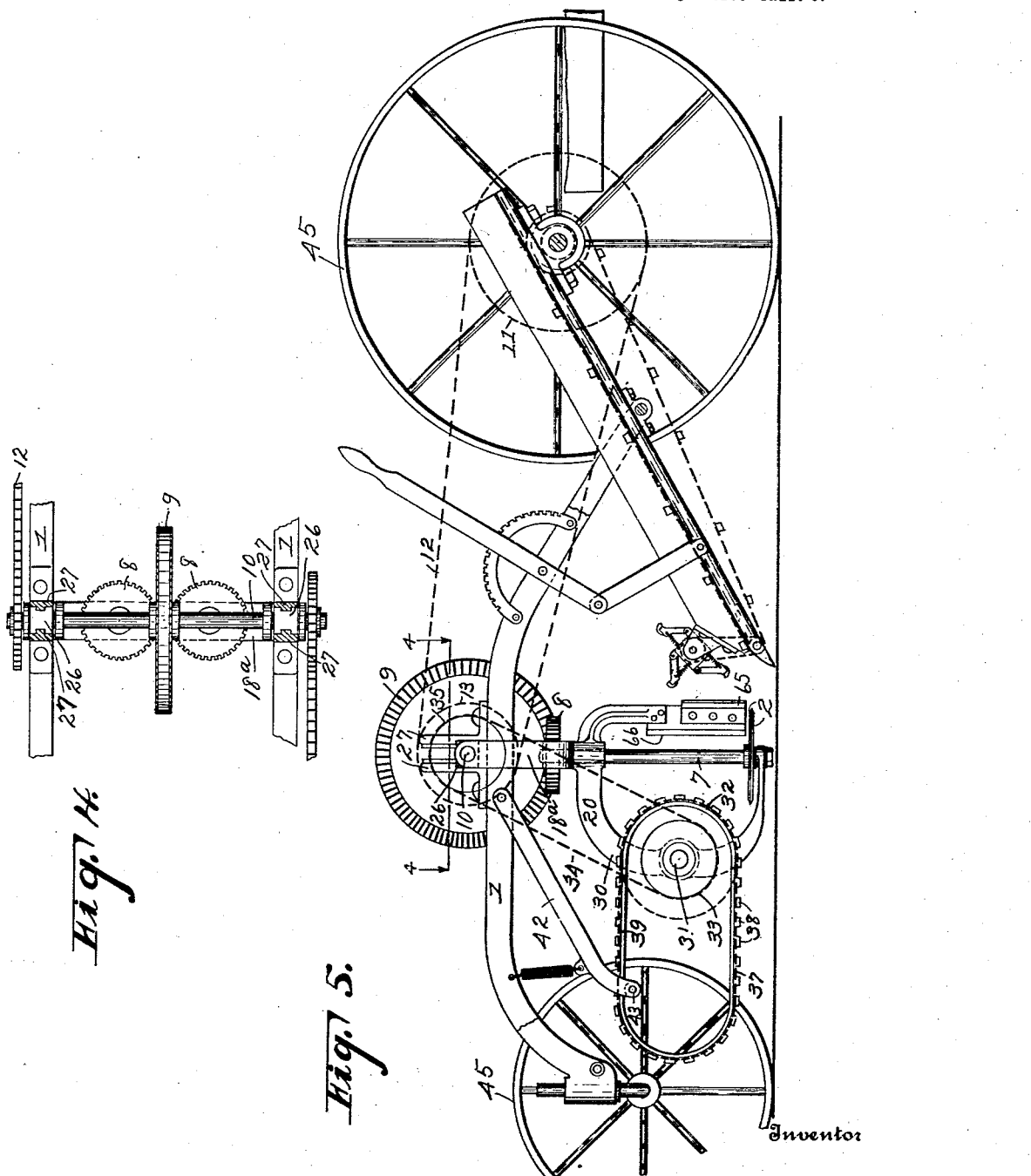

JOHN A. MUELLER, OF THIENSVILLE, WISCONSIN.

BEET TOPPER AND HARVESTER.

1,411,804.   Specification of Letters Patent.   Patented Apr. 4, 1922.

Application filed July 25, 1919. Serial No. 313,208.

*To all whom it may concern:*

Be it known that I, JOHN A. MUELLER, a citizen of the United States, residing at Thiensville, county of Ozaukee, and State of Wisconsin, have invented new and useful Improvements in Beet Toppers and Harvesters, of which the following is a specification.

My invention relates to improvements in beet toppers and harvesters.

The object of my invention is to provide means for folding the beet tops or leaves rearwardly in positions favorable for cutting them, and simultaneously adjusting a rotary cutter in position for cutting the tops without cutting the roots, and preferably causing the same to cut the tops, or at least to commence the cutting process, while the leaves are still held in rearwardly folded position by the folding apparatus.

In the drawings:—

Figure 1 is a side elevation, showing the principal features of a beet harvester embodying my invention, with parts thereof in section.

Figure 2 is a front elevation of the topping mechanism, showing also one front wheel and a portion of the axle and frame.

Figure 3 is a sectional view on line 3—3 of Figure 1.

Figure 4 is a sectional view on line 4—4 of Figure 5.

Figure 5 shows modified cutter mechanism.

Like parts are identified by the same reference characters throughout the several views.

My improved beet topper comprises a four wheeled vehicle, the main frame 1 of which supports the mechanism. The topping blades 2 are supported by a set of vertically disposed parallel shafts 7, provided at their upper ends with pinions 8, the latter being disposed upon opposite sides of an actuating gear wheel 9 mounted upon the cross shaft 10. The cross shaft 10 is driven from a sprocket wheel 11 on the rear axle by a chain 12 which runs over a sprocket pinion 13 on shaft 10. The shaft 10 is mounted in suitable bearings 15 on the frame bars.

Each of the shafts 7 is journaled in a guide sleeve or bearing member 17, which is hung from the frame bars 15 by a yoke 18. Within the yoke, and below the pinion 8, each shaft 7 is provided with an annular flange 19, adapted to be engaged by a forked arm 20, whereby the shafts 7 may be lifted while being rotated.

In Figure 1, the upper ends of the shafts 7 are squared, and are adapted to slide, when lifted, through the pinions 8, the latter being supported from the yoke 18 by a cross arm 25 on the side arms or vertically extending legs of the yoke. In Figure 5, the arrangement is such that the arm 20 lifts a yoke 18ª which carries with it the bearings 26 for the shaft 10, these being mounted to slide in suitable guides 27 on the frame 1. In either form of construction, the shafts 7, together with the blades 2, are lifted or lowered when the arm 20 is raised or lowered, and in both forms of construction the blades may be continuously rotated while being lifted or lowered by means of the driving sprocket chain 12.

It will be apparent that the blades 2 will rotate in opposite directions, inasmuch as the pinions 8 are located on the opposite sides of the gear wheel 9, the latter being provided with an annular row of gear teeth on each of its respective side faces.

The arms 20 are provided with downwardly extending elbowed portions 30, in which a supporting cross shaft 31 is journaled. This cross shaft is provided with a set of sprocket wheels 32, having a sprocket pinion 33 at one end, driven by a chain 34 from a driving sprocket wheel 35 mounted upon the cross shaft 10. The set of sprocket wheels 32 are adapted to drive an endless belt or apron 37, having cross slats 38, said endless belt or apron being supported upon an oval shell 39, which extends around, or partially around, arm 40 mounted on shaft 31, or supported from the shaft by the sprocket wheels 32, the other end of the shell projecting forwardly, and being supported from the overhead frame bar by hangers 42, and a cross rod or bar 43. The diameters of the sprocket wheels or pinions 33 and 35, as compared with the main driving sprocket wheel 11 on the rear axle are so proportioned that the belt or apron 37 will be driven rearwardly on the underside thereof at a greater rate of speed than that of the vehicle as it moves forwardly along the row of beets to be harvested. Therefore, the cross bars 38 will operate as untoothed rakes, or as the working members of a scraping or tractive leaf folder or conveyor, to engage the beet tops or leaves, and carry them backwardly over the root crowns, without scratching or cutting into the crowns as would be the case if rake teeth were used. This conveyor not only serves to position the tops or leaves favorably for the cutting operation, but it also positions the blades 2, for the arms 20 are supported from the shaft 31, and the shell about which this conveyor travels, said arms 20 having extensions 39 wherein shafts 7 are journaled below blades 2.

It will be observed that the blades 2 revolve in a horizontal plane, with the margin of one slightly overlapping the margin of the other, and that both blades are located in close proximity to the slats or cross bars 38 of the leaf folding conveyor, the front margins of the blades being preferably located at a distance of about one inch from the position occupied by a slat or cross bar 38, immediately prior to commencing its upward travel about the sprocket wheels 32. The blades are also located substantially in a horizontal plane which includes the bottom surfaces of the slats or cross bars 38 when traveling along the underside of the shell 39. The shell is preferably transversely divided, and formed of resilient material, whereby it may yield or vibrate to avoid excessive friction whenever fragments of leaves or other material tend to crowd in between the slats and the shell.

The mode of operation of the parts above described will be readily understood from the description above given. But it may be briefly stated that as the vehicle travels forwardly with its main supporting wheels 45 straddling the row of beets, the leaf folding conveyor will operate with a tractive effect upon the beet tops or leaves to fold them rearwardly, and as the slats 38 travel across the crowns of the roots at the rear end of the folder, they support the blades 2 in a position to cut the tops or leaves without cutting or scratching the crowns to a sufficient depth to remove or break the skin. This is an exceedingly important feature of my invention, for the reason that a cutting of the crowns allows the beet juice and soluble sugars to escape, and greatly impairs the nutritive value of the beets, as well as their flavor.

The major portions of the leaves will be delivered laterally by the rotating cutter blades 2 with which stationary curved guides 65, (or other lateral feeding devices) cooperate. The guides 65 preferably meet in a vertically disposed cutting edge at 66 to prevent the beet tops from clogging at the apex formed by the guides above the overlapping portions of the blades 2.

I claim:—

1. In a beet topper, a revoluble leaf folder, means for actuating the topper forwardly along a row of beets, means for revolving the folder in a direction to carry the leaves of the beets rearwardly, leaf cutting means positioned by the folder for operation upon the leaves, said folder comprising an apron composed of a set of flexibly connected leaf engaging cross bars, and a guide for the apron, adapted to hold the bars in a common plane along the leaf engaging under side.

2. In a beet topper, the combination with a wheeled vehicle, a set of depending shafts provided with cutter blades, connections for driving said shafts and blades from one of the vehicle wheels, of an auxiliary tractor supported from the vehicle, and operative in front of the blades to support the latter, said tractor comprising an endless apron driven by the vehicle at a greater speed than the vehicle travels, and adapted to travel upon the row of beets to fold the leaves and support the cutting blades at the proper level, the front end of said tractor being free to move vertically independently of the rear portion.

3. In a beet topper, the combination with top cutting mechanism, of a leaf folding conveyor disposed wholly in advance of the cutting mechanism, and adapted to travel upon the crowns of the beets, means for actuating the said conveyor rearwardly along said crowns, and means for utilizing the rear end only of the conveyor to support the cutting mechanism at the proper level.

4. In a beet topper, the combination with top cutting mechanism, of a leaf folding conveyor disposed in advance of the cutting mechanism, and adapted to travel upon the crowns of the beets, means for actuating the said conveyor rearwardly along said crowns, said conveyor comprising an endless series of flexibly connected bars, each disposed transversely to the line along which they travel, and a support for said bars, adapted to hold them substantially in a common plane along the under side of the conveyor.

5. In a beet topper and harvester, the combination with a wheeled vehicle having a frame provided with depending shafts and cutters, adapted for vertical adjustment, of an elongated shell provided with substantially semi-cylindrical end portions loosely supported from the frame in front of the cutters, an endless tractive apron extending about said shell and adapted to rest upon the beet tops and crowns, means controlled by the rear end portion of said apron for positioning the cutter, and means connected with the vehicle for driving the apron at a greater rate of speed than the vehicle travels, and with its lower surface moving in an opposite direction to that of vehicle travel.

6. In a beet topper and harvester, the combination with a wheeled vehicle having a frame provided with depending shafts and cutters, adapted for vertical adjustment, of an elongated shell provided with substantially semi-cylindrical end portions loosely supported from the frame in front of the cutters, and endless tractive apron extending about said shell and adapted to rest upon the beet tops and crowns, means controlled by the rear end portion of said apron for positioning the cutter, and means connected with the vehicle for driving the apron at a greater rate of speed than the vehicle travels, and with its lower surface moving in an opposite direction to that of vehicle travel, said apron having a series of transversely disposed rake bars adapted to engage the leaves and fold them rearwardly.

7. In a beet topper, the combination with top cutting mechanism, of a leaf folding conveyor disposed in advance of the cutting mechanism, and adapted to travel wholly upon the crowns of said beets prior to the cutting operation, and means for actuating said conveyor rearwardly along said crowns, the front end of the said conveyor being free to move vertically independently of the rear portion.

8. In a beet topper, the combination with top cutting mechanism, of a leaf folding conveyor disposed in advance of the cutting mechanism, and adapted to travel upon the crowns of said beets prior to the cutting operation, and means for actuating said conveyor rearwardly along said crowns, said conveyor being free to move at either end independently of the other end.

In testimony whereof I affix by signature in the presence of two witnesses.

JOHN A. MUELLER.

Witnesses:
    LEVERETT C. WHEELER,
    O. C. WEBER.